United States Patent
Murdie et al.

(10) Patent No.: US 6,315,974 B1
(45) Date of Patent: Nov. 13, 2001

(54) METHOD FOR MAKING A PITCH-BASED FOAM

(75) Inventors: Neil Murdie; James F. Pigford; Michael D. Wood, all of South Bend; Frank Dillon, Granger; Charles A. Parker, Granger; Stanley N. Hemstad, Granger, all of IN (US)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/112,994

(22) Filed: Jul. 10, 1998

Related U.S. Application Data

(63) Continuation-in-part of application No. 08/970,558, filed on Nov. 14, 1997, now Pat. No. 6,077,464.
(60) Provisional application No. 60/086,371, filed on May 22, 1998.

(51) Int. Cl.[7] .................................................. C01B 31/02
(52) U.S. Cl. ...................................... 423/445 R; 264/29.1
(58) Field of Search .......................... 423/445 R; 208/45; 502/180; 264/29.1

(56) References Cited

U.S. PATENT DOCUMENTS

| | | | |
|---|---|---|---|
| 3,663,171 | 5/1972 | Granger | 23/209 |
| 3,937,775 | 2/1976 | Horikiri | 264/29 |
| 4,276,246 | 6/1981 | Bonzom et al. | 264/53 |
| 4,537,823 | 8/1985 | Tsang et al. | 428/308.4 |
| 4,605,595 | 8/1986 | Tsang et al. | 428/413 |
| 4,832,870 | 5/1989 | Clough | 252/511 |
| 4,891,203 | 1/1990 | Singer et al. | 423/449 |
| 4,975,261 | 12/1990 | Takabatake | 423/445 |
| 4,986,943 | 1/1991 | Sheaffer et al. | 264/29.1 |
| 5,015,522 | 5/1991 | McCullough et al. | 428/312.2 |
| 5,071,631 | 12/1991 | Takabatake | 423/445 |
| 5,300,272 | 4/1994 | Simandi et al. | 423/445 |
| 5,547,737 | 8/1996 | Evans et al. | 428/178 |
| 5,744,510 | 4/1998 | Pekala | 521/181 |
| 5,770,127 | 6/1998 | Abrams et al. | 264/29.1 |
| 5,789,338 | 8/1998 | Kaschmitter et al. | 502/418 |
| 5,868,974 | 2/1999 | Kearns | 264/29.6 |
| 6,033,506 * | 3/2000 | Klett | 156/78 |
| 6,037,032 | 3/2000 | Klett | 428/71 |
| 6,146,611 * | 11/2000 | Dillon et al. | 423/445 R |

FOREIGN PATENT DOCUMENTS

| | | | |
|---|---|---|---|
| 0 562 591 A | 9/1993 | (EP) | C04B/35/52 |
| 61270205 | 11/1986 | (JP) | |
| 2142891 | 5/1990 | (JP) | C01B/31/00 |
| WO 93 24590 | 12/1993 | (WO) | C10C/3/00 |

OTHER PUBLICATIONS

Processing, Structure, and Morphology of Graphitic Carbon Foams Produced From Anisotropic Pitch, D. Dutta, C.S. Hill, D.P. Anderson, Mat. Res. Soc. Symp. Proc. vol. 349, "Novel Forms of Carbon II", pp. 61–6, 1994.

Aligned Graphitic Carbon Foams From Mesophase Pitch, D. Dutta, C.S. Hill, MD–vol. 53, Cellular and Microcellular Materials, ASME 1994 pp. 63–70.

Formulation of a Mathematical Process Model For the Foaming of a Mesophase Carbon Precursor, S.S. Sandhu, J.W. Hager, Mat. Res. Soc. Symp. Proc. vol. 270, Materials Research Society 1992.

Novel Hybrid Composites Based on Carbon Foams, J.W. Hager, M.L. Lake, Mat. Res. Soc. Symp. Proc. vol. 270, Materials Research Society 1992 pp. 29–33.

R. Metha, et al.: "Graphitic carbon foams: Processing and characterization" 1993, American Carbon Society XP002061088 pp. 104 & 105.

"Industry Outlook"; Aviation Week & Space Technology, p. 13/Nov. 13, 1995.

Ultramet Engineered Materials Solutions brochure, 3 pp. / Mar., 1992.

Ultrafoam "Open–Cell Silicon Carbide Foam" data, Ultramet, Nov. 14, 1995.

Ceramic Bulletin, vol. 70, No. 6, 1991, pp. 1025–1027: "Refractory Ceramic Foams: A Novel, New High–Temperature Structure".

* cited by examiner

*Primary Examiner*—Stuart L. Hendrickson
(74) *Attorney, Agent, or Firm*—Larry J. Palguta

(57) ABSTRACT

A mesophase pitch material having a melting point in excess of 350° C. has a solvent added thereto to provide a solvated mesophase pitch. A low molecular weight solvent is used so that the melting point can be brought low enough to create a carbon foam at a convenient temperature. The solvent is then removed by heat and/or vacuum and, consequently, the pitch reverts to a high melting point of approximately greater than 350° C. The pitch can then be heated or carbonized without an oxidative stabilization step. Alternatively, a solvated mesophase pitch material may be used initially for foaming.

14 Claims, 1 Drawing Sheet

METHOD FOR MAKING A PITCH-BASED FOAM

This patent application claims priority upon U.S. provisional patent application No. 60/086,371, filed May 22, 1998.

This is a continuation-in-part of U.S. patent application Ser. No. 08/970,558, filed Nov. 14, 1997, now U.S. Pat. No. 6,077,464.

The present invention relates generally to the utilization of a solvated mesophase pitch to make a carbon foam, and in particular to the use of a solvated mesophase pitch to make a carbon foam which requires little or no oxidative stabilization prior to carbonization of the carbon foam.

Carbon-carbon composites are widely used for aircraft brake friction materials. Although carbon-carbon is attractive because it is lightweight and can operate at very high temperatures, the use of carbon-carbon raw material entails the use of an expensive material. Expensive carbon fiber is a significant component; sometimes up to 45 percent fiber is used in making the composite. Additionally, the manufacture of carbon-carbon is a time-consuming process. Long cycle times are undesirable in a modern manufacturing environment. U.S. Pat. No. 6,077,464 describes inventions for making an aircraft brake friction material by means of a carbon-carbon composite material made from densified carbon foam. U.S. Pat. No. 6,077,464 is incorporated by reference in its entirety herein. The manufacturing process disclosed therein may be generally described by the steps of utilizing a precursor material (thermoset or thermoplastic), foaming the precursor material, oxygen stabilization for foams produced from thermoplastics, carbonization, optional heat treatment, densification, and a subsequent heat treatment. As disclosed in the above paten, when a foam is made from a thermoplastic such as a mesophase pitch, it may be necessary to cross link the foam by oxidation before it can be heated to carbonization temperatures. Without this oxidation (stabilization) step, the pitch may melt when it is heated. The oxidative stabilization step can be a time-consuming process (up to 100 hours). The objective of the inventions disclosed herein is to reduce the time required for processing the carbon foam by eliminating or replacing, or shortening, the oxidative stabilization step.

The inventions disclosed herein utilize solvated mesophase pitches which offer the potential for foaming at low temperatures, followed by carbonization at high temperatures without the need for stabilization. By using a solvated mesophase pitch, a carbon foam preform can be produced by the methods described in U.S. Pat. No. 6,077,464 and herein. Removal of the "solvent" fraction of the mesophase ensures that the mesophase pitch has a higher softening point (greater than 350° C.) than the onset temperature of carbonization (300–500° C.). Thus, the mesophase carbonizes before it can soften, thereby eliminating the requirement for stabilization.

The present invention obviates the need for oxidative stabilization and provides solutions to the above by providing a pitch-based carbon foam suitable for carbonization, comprising a solidified open-cellular carbon foam having a softening point to greater than 350° C., the foam made from a solvated pitch material having a softening point below 300° C. which was heated to effect melting of the pitch material, foamed to provide the open-cellular carbon foam and the solvent removed to raise the softening point to greater than 350° C. and solidify the foam, to provide the pitch-based carbon foam suitable for carbonization.

The inventions disclosed herein utilize a solvated mesophase pitch to solve the problem of eliminating or replacing, or shortening, the oxidative stabilization step. The natural, unsolvated melting point of the pitch is generally in excess of 350° C., such that the pitch will begin to carbonize before it begins to melt. Using a low molecular weight solvent, the melting point can be lowered low enough to be foamed at a convenient temperature, then the solvent is removed by heat with or without vacuum. Consequently, the pitch reverts to its high melting point and may be carbonized without a stabilization step. The advantages of this approach can be realized if the devolatilization or solvent removal step is faster than the oxidation step it eliminates.

The process may be generally described by the following steps:

Plasticization: A high softening point mesophase pitch (greater than 350° C.) is plasticized with solvent to a lower softening point below 300° C.

Heating: Heating solvated mesophase pitch to melt at one atmosphere, such as heating in an autoclave or other device such that the pitch can be pressurized with nitrogen gas.

Foaming: Cause material to foam by either vaporization of volatile material or a pressure drop, to provide an open cellular structure.

Solvent removal: Vaporization or vacuum draws out plasticizer causing the softening point of the pitch foam to rise, and solvent extraction continued until the softening point increases to greater than 350° C.

Carbonization: The foam can now be carbonized (heating to the range of 600–2000° C.) and oxidative stabilization is not required because the pitch will carbonize without melting.

Figure 1:
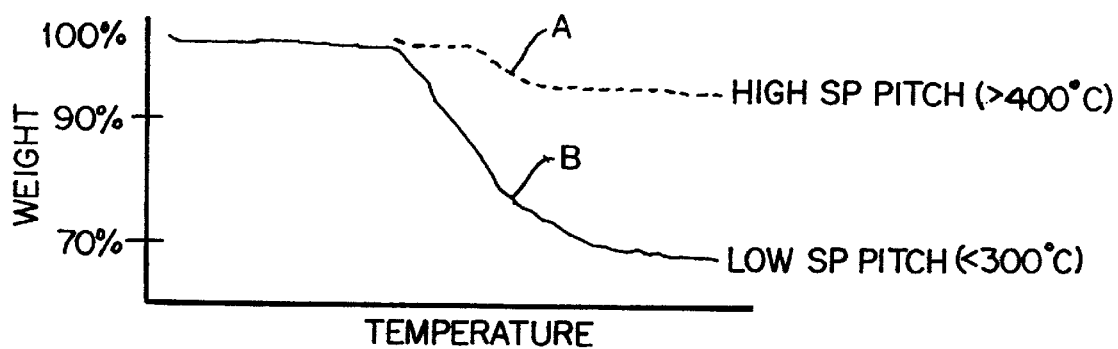
FIG. 1 is a graph illustrating the weight losses of high and low softening point pitches during carbonization.

The process generally described above has an additional advantage over creating a carbon foam from a low softening point pitch with a physical blowing agent, in that the weight loss upon carbonization will be less for the high softening point pitch. This is illustrated in FIG. 1 which demonstrates that as temperatures increase during carbonization, the high softening point pitch experiences considerably less weight loss. Additionally, the high softening point pitch will have higher viscosity which will provide more alignment of mesophase within the strut regions of the foam. Also the lower weight loss of the high softening point pitch in curve A will provide less cracking during carbonization.

Pitches

In general, the following pitches may be utilized for the process and materials disclosed herein:

1. Mesophase pitches
2. Isotropic (coal tar, petroleum derived)
   a. Isotropic (coal tar and petroleum derived pitches) may be converted to mesophase by a thermal treatment and subsequent extraction; or
   b. They can also be converted to mesophase by use of a catalyst and extraction, leading to a pitch with softening point greater than 350° C.
3. Synthetic mesophase pitches can also be used, eg, derived from naphthalene/anthracene or alkyl benzene.
   a. The above pitches have a low softening point of approximately 200 to 300° C. They can be treated as follows: devolatilization with vacuum, or treat with heat and then extract the mesophase to increase the softening point to 350° C., then add back the plasticizer to obtain the desired softening point.

Another way to treat mesophase pitches derived from isotropic, synthetic or low softening point pitches is to partially, oxidatively, stabilize or thermoset the pitch to increase the softening point to greater than 350° C. then add back plasticizer and reduce the softening point below 300° C. The general approach is to provide a mesophase pitch with softening point of greater than 350° C. and add back a solvent/plasticizer to reduce softening point to less than 300° C. Solvated mesophase pitches have been provided by and disclosed in Kalback, et al., U.S. Pat. No. 5,259,947, issued Nov. 9, 1993 to Conoco Inc.

Plasticizers

The functions of plasticizers is to lower the softening point of mesophase pitch without modification of the mesophase characteristics and to be subsequently easily removable by vacuum or heat to provide an ephemeral solvent. Examples of plasticizers comprise tetrahydrofuran, tolulene, pyridine, benzene, xylene, which is not an exhaustive list. These are aromatic or conjugated compounds which are hydrogen donors. They will interact with and solubilize the mesophase pitch polyaromatic molecules.

Foaming

Several approaches can be utilized to foam the above described solvent-pitch mixtures. The process may be generally described by using the solvent as a native blowing agent, and then:

a. Heat the mixture to a temperature $T_0$, where b. The mixture becomes soft c. Pressurize the mixture to $P_0$ d. Lower the pressure to $P_1$ where the solvent/plasticizer foams bubbles; it is desirable to nucleate many small bubbles simultaneously e. Lower the pressure further to open the bubbles to the outside (make open cells)

f. Then continue to extract solvent to cause solidification and/or raise the melting point of the foam.

Figure 2:
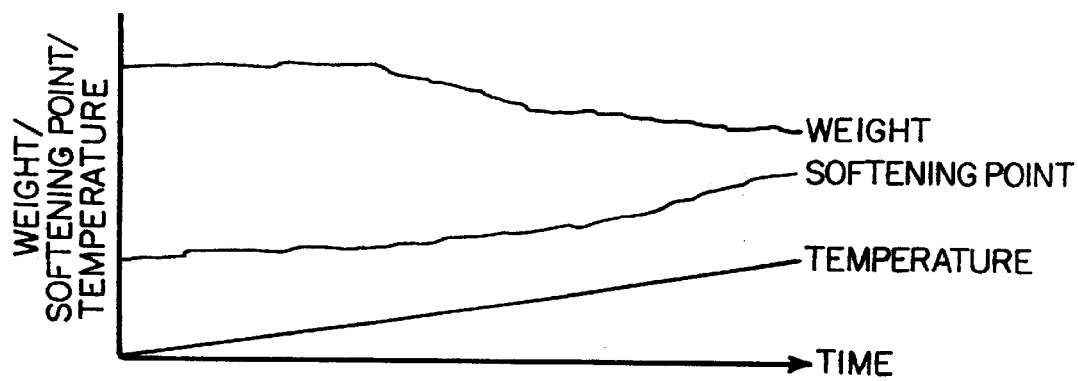
FIG. 2 is a graph illustrating the increase of the softening point of the carbon foam during carbonization.

Several variations may be utilized within this process. First, another physical blowing agent can be added, such as $N_2$, $CO_2$, chlorofluorocarbons, air, hydrofluorocarbons, water vapor, paraffin (eg. pentane) and perform cycles 1a–1e above. Second, add a chemical blowing agent (e.g. azides or carbonates) which liberate $N_2$ or $CO_2$ on heating. Perform cycles 1a–1e above. Note that in the case of using a chemical blowing agent, and some physical blowing agents which have boiling points above room temperature, that performing cycles 1a–1e will work with $P_1=P_0$. Third, add physical blowing agents such as $N_2$ and $CO_2$ or paraffin by heating under pressure of the gas and cool under pressure. This physical blowing agent plus the plasticizer can subsequently both be used to foam the pitch following cycles 1a–1e above. Fourth, perform the whole process (steps 1a–1e above) at one pressure, e.g. 1 atmosphere. When a physical blowing agent such as $N_2$, $CO_2$ or paraffin is used, these may plasticize the pitch as well, so that when they come out of solution on foaming the pitch solidifies, retaining the other plasticizer, e.g. pyridine, tetrahydrofuran, benzene, and so on, which would have to be removed by vacuum. This allows flexibility and high precision control of pore size distribution which is subsequently important, if not critical, for subsequent densification, if required. The control of pore size distribution leads to the control of the density and microstructure, and hence the mechanical properties of the foam. The benefit pertaining to viscosity is that by foaming at a higher viscosity, the alignment of mesophase in the strut regions of the foam will be enhanced, providing improved orientation in struts and better thermal and mechanical properties. There is a well-defined viscosity range which allows foaming of mesophase pitches to occur. It is essential that foaming be performed at the higher end of the viscosity range to attain optimum shear and alignment. The process described above yields a carbon foam which requires little or no oxidative stabilization since the softening point of the pitch after extraction of plasticizers is greater than the carbonization onset temperature, and thus melting or bloating will not occur. In other words, as the pitch is heated, the melting point will continue to increase by removal of hydrogen and condensation of molecules, such that the melting point is always higher than the temperature at which the condensation is occurring. FIG. 2 illustrates this relationship wherein as temperature is increased over time during carbonization, the softening point also increases and remains above the temperature of carbonization.

Carbonization

Figure 3:
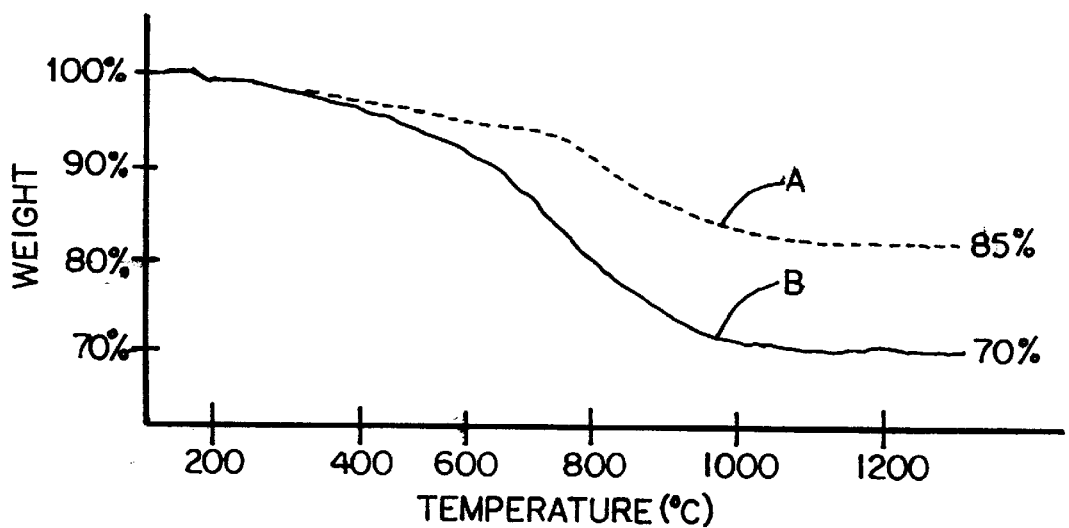
FIG. 3 illustrates the advantages of utilizing a solvated mesophase pitch A, as compared to utilizing a conventional pitch B.

Generally, carbonization is performed to temperatures between 600° C. to 2000° C. As illustrated in FIG. 3, the use of a solvated mesophase pitch material provides a higher carbon yield, and a slower rate of devolatilization during carbonization. Therefore, there is a reduction in damage to the foam (cracks and so on) both in bulk foam and microcracks within the struts. Further, slow devolitilization retains the molecular alignment in the struts better than would a rapid devolatilization during carbonization. In FIG. 3, curve A represents the utilization of a solvated mesophase pitch as described herein, while curve B illustrates the utilization of a conventional mesophase pitch such as Mitsubishi AR pitch.

EXAMPLE

A Conoco solvated mesophase pitch, made in accordance with Kalback, et al. U.S. Pat. No. 5,259,947, was used to create a foam in an autoclave. 25 g of the Conoco solvated pitch was heated in an aluminum sample boat in a flow of dry nitrogen gas within an autoclave vessel. The temperature/pressure/time cycle used was as follows: (1) pitch heated from 25° C. to 340° C. at (system open, nitrogen purge) 160° C./hr, (2) sample soak at 340° C. for 20 minutes (system open, nitrogen purge), (3) autoclave system closed and sample/vessel pressurized with 1000 psi nitrogen gas, (4) sample cooled from 340° C. to 266° C. at 80° C./hr, (5) sample heated from 266° C. to 290° C. at 80° C./hr, (6) sample soaked at 290° C. for two hours, (7) vessel/sample depressurized from 1000 psi to 15 psi in three seconds, (8) sample allowed to cool from 290° C. to 25° C. at 25° C./hr. The foam was placed in the vacuum oven overnight at 90° C. The foam was carbonized without an intermediate oxidative stabilization step. The carbonization cycle involved heating the part to 810° C. in thirty-three hours, then holding for one hour. The carbon yield (ie., weight residue remaining after carbonization) was 81.2 weight %. The carbonization was successful without bloating or melting of the foam.

We believe that a preferred method for carrying out the invention is to provide a solvated mesophase pitch (made in accordance with Kalback, et al. U.S. Pat. No. 5,259,947) that is heated from 25° C. to 300° C. in two hours under flowing nitrogen gas in an open autoclave system. When 300° C. is attained, the vessel (sample) is pressurized to 800 psi. The vessel is allowed to cool down to a temperature of 268° C. This temperature is maintained for a 2.5 hour soak, after which the vessel is depressurized from 800 psi to 15 psi within two-three seconds. The resultant foam within the vessel is allowed to cool slowly such that it takes 8–10 hours to cool from 268° C. to 25° C. Experiments performed indicate that the microstructure and physical properties of these foams are profoundly influenced by the temperatures/pressures used in the process. Small pore sizes are favored by lower operating temperatures and pressures.

The inventions disclosed herein illustrate that a carbon foam material can be provided either without the need for an oxidative stabilization of the material or with the oxidative stabilization, disclosed in U.S. Pat. No. 6,077,464, shortened significantly and preferably eliminated.

We claim:

1. A method for making a pitch-based carbon foam, comprising the steps of providing a pitch material having a softening point of greater than 350° C., adding a solvent to the pitch material which lowers the softening point of the material to below 300° C., heating the solvated pitch material to effect melting thereof, foaming the material to provide an open cellular carbon foam, removing the solvent from the carbon foam and raising the softening point to greater than 350° C. such that the carbon foam solidifies, and heating the foam within the range of 600–2000° C. to remove volatiles therefrom and provide the pitch-based carbon foam.

2. The method in accordance with claim 1, wherein the solvated mesophase pitch material is heated at one atmosphere of pressure.

3. The method in accordance with claim 1, wherein the pitch material comprises one of a mesophase pitch, modified isotropic pitches, coal tars, petroleum derived pitches, and synthetic pitches.

4. The method in accordance with claim 1, wherein the solvent comprises one of tetrahydrofuran, tolulene, pyridine, benzene, and xylene.

5. The method in accordance with claim 1, wherein the foaming step comprises lowering the pressure to cause the material to form bubbles, and then further lowering the pressure to open the bubbles to form open cells.

6. The method in accordance with claim 1, wherein the foaming step comprises the use of a physical blowing agent comprising one of $N_2$, $CO_2$, chlorofluorocarbons, air, hydrofluorocarbons, water vapor, pentane.

7. The method in accordance with claim 1, wherein the foaming step is accomplished by one of (a) continued heating and (b) continued heating and lowering the pressure.

8. A method for making a pitch-based carbon foam, comprising the steps of providing a solvated pitch material having a softening point of below 300° C., heating the solvated pitch material to effect melting thereof, foaming the material to provide an open-cellular carbon foam, removing a solvent fraction from the carbon foam and raising the softening point to greater than 350° C. such that the carbon foam solidifies, and heating the foam within the range of 600–2000° C. to remove volatiles therefrom and provide the pitch-based carbon foam.

9. The method in accordance with claim 8, wherein the solvated pitch material is heated at one atmosphere of pressure.

10. The method in accordance with claim 8, wherein the pitch material comprises one of a mesophase pitch, modified isotropic pitches, coal tars, petroleum derived pitches, and synthetic pitches.

11. The method in accordance with claim 8, wherein the solvent of the pitch material comprises one of tetrahydrofuran, toluene, pyridine, benzene, and xylene.

12. The method in accordance with claim 8, wherein the foaming step comprises lowering the pressure to cause the material to form bubbles, and then further lowering the pressure to open the bubbles to form open cells.

13. The method in accordance with claim 8, wherein the foaming step comprises the use of a physical blowing agent comprising one of $N_2$, $CO_2$, chlorofluorocarbons, air, hydrofluorocarbons, water vapor, pentane.

14. The method in accordance with claim 8, wherein the foaming step is accomplished by one of (a) continued heating and (b) continued heating and lowering the pressure.

\* \* \* \* \*